(12) United States Patent
DeRose et al.

(10) Patent No.: US 7,984,657 B2
(45) Date of Patent: Jul. 26, 2011

(54) METHOD FOR OPERATING A TORQUE SYSTEM CONFIGURED TO TIGHTEN A SERIES OF FASTENERS

(75) Inventors: Lynn Ann DeRose, Gloversville, NY (US); Janet Sue Bennett, Scotia, NY (US); James Nelson Bratton, Cary, NC (US); Michael Orlando Cimini, Fairfield, OH (US); Douglas Roy Forman, Niskayuna, NY (US); Brandon Stephen Good, Schenectady, NY (US); Morgan Frederic Intrator, Nashville, TN (US); Lee Roy LaPierre, Woburn, MA (US); Gregory Alan Richardson, Cary, NC (US); Craig Douglas Young, Maineville, OH (US)

(73) Assignee: General Electric Company, Niskayuna, NY (US)

( * ) Notice: Subject to any disclaimer, the term of this patent is extended or adjusted under 35 U.S.C. 154(b) by 1286 days.

(21) Appl. No.: 11/561,040

(22) Filed: Nov. 17, 2006

(65) Prior Publication Data

US 2008/0115589 A1    May 22, 2008

(51) Int. Cl.
*B25B 23/144* (2006.01)
(52) U.S. Cl. .................. 73/862.333; 73/862.22; 81/479
(58) Field of Classification Search .. 73/862.21–862.23; 29/700–709, 407.03, 470.04, 428, 446; 173/2, 173/182, 217; 81/476–478
See application file for complete search history.

(56) References Cited

U.S. PATENT DOCUMENTS

| | | | |
|---|---|---|---|
| 6,796,190 B2 * | 9/2004 | Curry ......................... | 73/862.21 |
| 6,968,759 B2 * | 11/2005 | Becker et al. ................... | 81/479 |
| 7,082,865 B2 | 8/2006 | Reynertson, Jr. | |
| 7,089,834 B2 * | 8/2006 | Reynertson et al. ........... | 81/479 |
| 7,090,030 B2 | 8/2006 | Miller | |
| 7,096,596 B2 * | 8/2006 | Hernandez et al. ............. | 33/755 |
| 7,565,844 B2 * | 7/2009 | Crass et al. ................ | 73/862.21 |
| 2005/0223856 A1 | 10/2005 | Reynertson, Jr. | |
| 2005/0223857 A1 | 10/2005 | Reynertson, Jr. | |

FOREIGN PATENT DOCUMENTS

EP    1614506 A1    1/2006

\* cited by examiner

*Primary Examiner* — Minh Trinh
(74) *Attorney, Agent, or Firm* — Richard A. DeCristofaro

(57) ABSTRACT

A wireless-enabled tightening system for fasteners is disclosed. The system includes a visual designator configured to project an indicator onto a workpiece. The system also includes a torque wrench comprising a wireless transmitter and a means for identifying whether the correct torque has been applied to a fastener on the workpiece and configured to provide a feedback for a user. The system also includes a camera configured to capture an image of the workpiece when an appropriate amount of torque has been applied to the fastener. The system further includes a microprocessor for determining sequence of the fastener and identifying the tightened fastener.

6 Claims, 4 Drawing Sheets

METHOD FOR OPERATING A TORQUE SYSTEM CONFIGURED TO TIGHTEN A SERIES OF FASTENERS

BACKGROUND

The invention relates generally to process control systems, and more particularly to automatic radio frequency identification systems.

The construction of large mechanical assemblies, such as aircraft engines, often requires a rigorous process of tightening nuts and bolts in a particular order or sequence. Because the sequence in which fasteners are tightened is important, it is necessary for the assembly technician to keep track of which nuts or bolts have been tightened and to identify which fastener to tighten next.

In addition to being tightened in a specific order, assembly processes also often require the technician to retorque a nut or a bolt a different times during the assembly sequence. However, this technique is cumbersome and involves risks due to human error. There are several steps in the assembly process that may cause an operator to lose his place and miss a bolt or to tighten a bolt out of sequence.

Therefore, there is a need for an improved system that addresses the aforementioned issues.

BRIEF DESCRIPTION

In accordance with an embodiment of the invention, a wireless-enabled tightening system is provided. The system includes a visual designator configured to project onto a workpiece. The system also includes a torque wrench comprising a wireless transmitter and a means for identifying whether the correct torque has been applied to a fastener on the workpiece and configured to provide a feedback for a user. The system may also include a camera configured to capture an image of the workpiece when an appropriate amount of torque has been applied to the fastener. The system further includes a microprocessor for determining sequence of the fastener and identifying the tightened fastener.

In accordance with another embodiment of the invention, a method of operating a torque system is provided. The method includes applying a torque to a fastener among a series of fasteners on a workpiece via a torque wrench until a set torque is reached. The method also includes generating a trigger signal via the torque wrench once the set torque is reached. The method also includes sending the trigger signal from the torque wrench to a microprocessor. The method further includes capturing an image of the workpiece via a camera when the signal is received. The method also includes comparing the image of the workpiece with a generic image of the workpiece to identify a position of the torque wrench on the workpiece. The method further includes identifying the fastener on the workpiece that has been tightened depending on the position of the torque wrench in the captured image. The method also includes designating a next fastener among the series of fasteners to be tightened via a visual designator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a wireless-enabled tightening system for fasteners and a method of operating the same. As used herein, the term 'wireless' refers to a signal transmitted over a radio frequency or an ultrasonic frequency. Some non-limiting examples of the fasteners may include bolts and nuts. There are a number of fasteners that have to be tightened in a sequential pattern during assembly of various types of equipment, such as aircraft engine assemblies. The wireless-enabled tightening system disclosed herein allows for sequential tightening and tracking of the fasteners in such assemblies with minimal errors.

Figure 1:
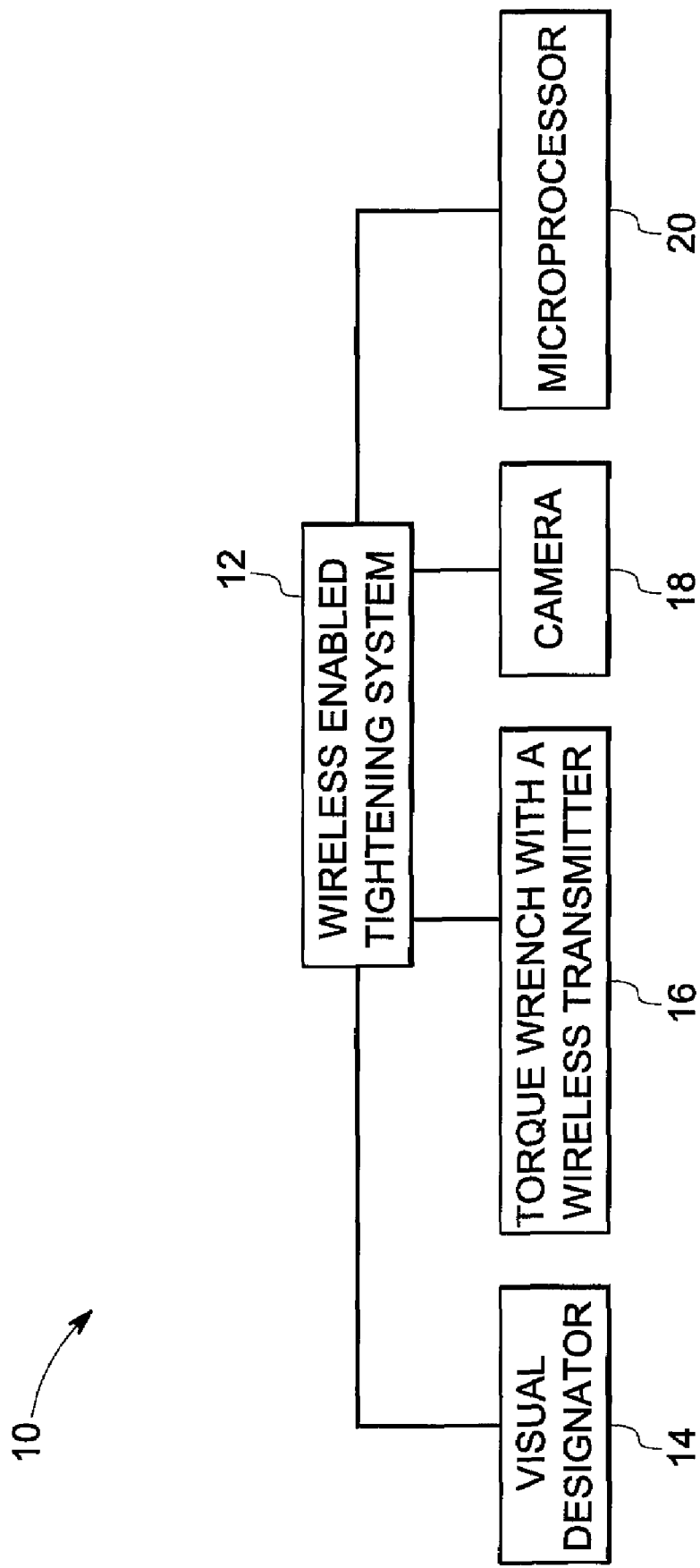
FIG. 1 is a block diagram representation of components of a wireless-enabled tightening system for fasteners in an assembly process.

FIG. 1 is a block diagram representation of components of a wireless-enabled tightening system 10 used for tightening a series of fasteners on a workpiece in a sequential pattern. A system 12 includes a visual designator 14 configured to project an indicator, such as a spotlight, onto the fastener in the workpiece that needs to be tightened. In a particular embodiment, the visual designator 14 may include a laser that provides a spotlight on the fastener that is to be tightened. In another embodiment, the visual designator 14 may project a beam that traces a line from a reference point such as a center of an engine hub to the fastener that is to be tightened. In yet another embodiment, the visual indicator 14 may project a beam of different colors for each fastener that is to be tightened such that each color corresponds to a specific number of times a fastener has already been tightened. A torque wrench 16 coupled to a wireless transmitter is configured to identify if a correct amount of torque has been applied on the fastener and provide an indication to a user. The indication provided triggers a camera 18 to capture an image of the workpiece. The captured image is input to a microprocessor 20 that is configured to compare the image with a generic matched image of the workpiece to identify a position of the torque wrench on the workpiece. As used herein, the term 'generic matched image' refers to an image of the workpiece with the sequence in which the fasteners should be tightened identified for convenience and stored for access by the microprocessor 20. In this way, the fastener that has just been tightened can be identified based upon the position of the torque wrench upon the workpiece. The microprocessor 20 is also configured to record data and automate a sequential process. In an example, the microprocessor 20 may store data regarding number of times a particular fastener has already been tightened. In another example, the microprocessor 20 may store data regarding the appropriate amount of torque that has to be applied to each of the fasteners.

Figure 2:
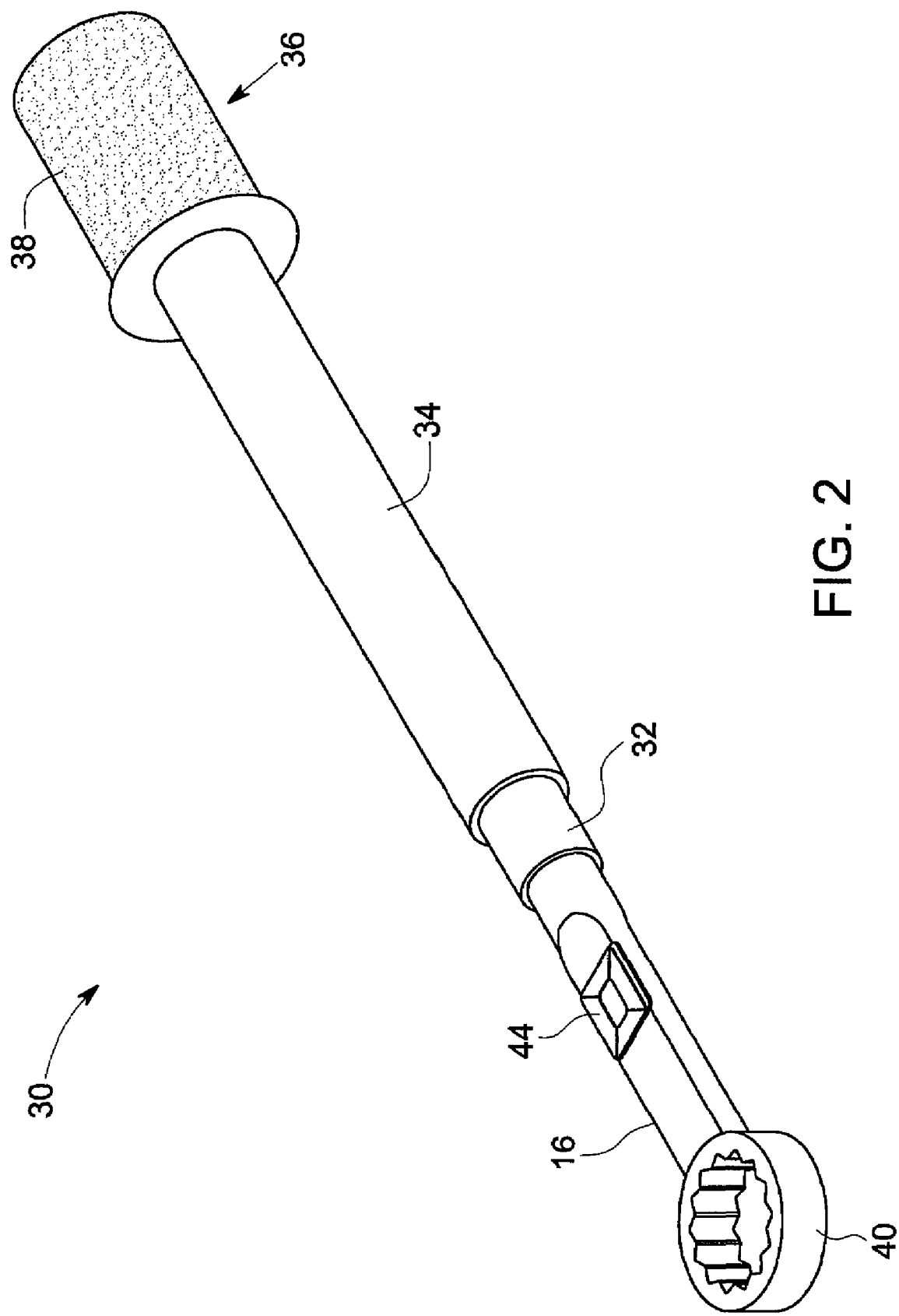
FIG. 2 is a diagrammatical illustration of a torque wrench used in FIG. 1.

FIG. 2 is a diagrammatical illustration 30 of the torque wrench 16 in FIG. 1. The torque wrench 16 is of a type that is adapted to tighten fasteners to a specified torque with a high degree of accuracy. In an example, the torque wrench 16 may be adapted to rotate fasteners to a torque within about plus or minus one percent of an indicated torque. In a particular embodiment, the torque wrench 16 may be a digital torque wrench. A digital torque wrench is a wrench that includes a digital meter that outputs the exact amount of torque being applied when tightening a fastener such as a nut or a bolt. It also provides feedback to a user when the desired torque is applied to the nut and bolt. In another embodiment, the torque wrench 16 may be configured to provide an analog output of the torque being applied. The torque wrench 16 may include a sensor (not shown) embedded in a tube 32 that is connected to a mounting tube 34. In a non-limiting example, the sensor may include a transducer. The sensor provides feedback to a user as to when a particular threshold amount of torque has been applied. The mounting tube 34 may be connected to a handle 36 providing an area for grasping of the torque wrench 10. In order to facilitate gripping, the handle 36 may be etched or provided with an elastomeric or a tactile covering 38. The torque wrench 16 includes a head 40. A wireless transmitter 44 may be attached onto the torque wrench 16 and configured to transmit a signal indicating that an appropriate amount of torque has been applied. In another example, the wireless transmitter 44 may be embedded in the handle 36.

In a particular embodiment, the torque wrench 16 may include a ratchet type of assembly wherein each rotation or click of the ratchet represents a discrete level of torque being applied. In another embodiment, the torque wrench 16 may include a bendable beam type wrench having a strain gauge, whereby a user is provided with an indication as to a torque being applied by observing degree of deflection of the bendable beam relative to the strain gauge. In another example, the torque wrench 16 may be handheld. In an embodiment, the torque wrench 16 may include a sensor configured to indicate when an appropriate amount of torque has been applied.

Figure 3:
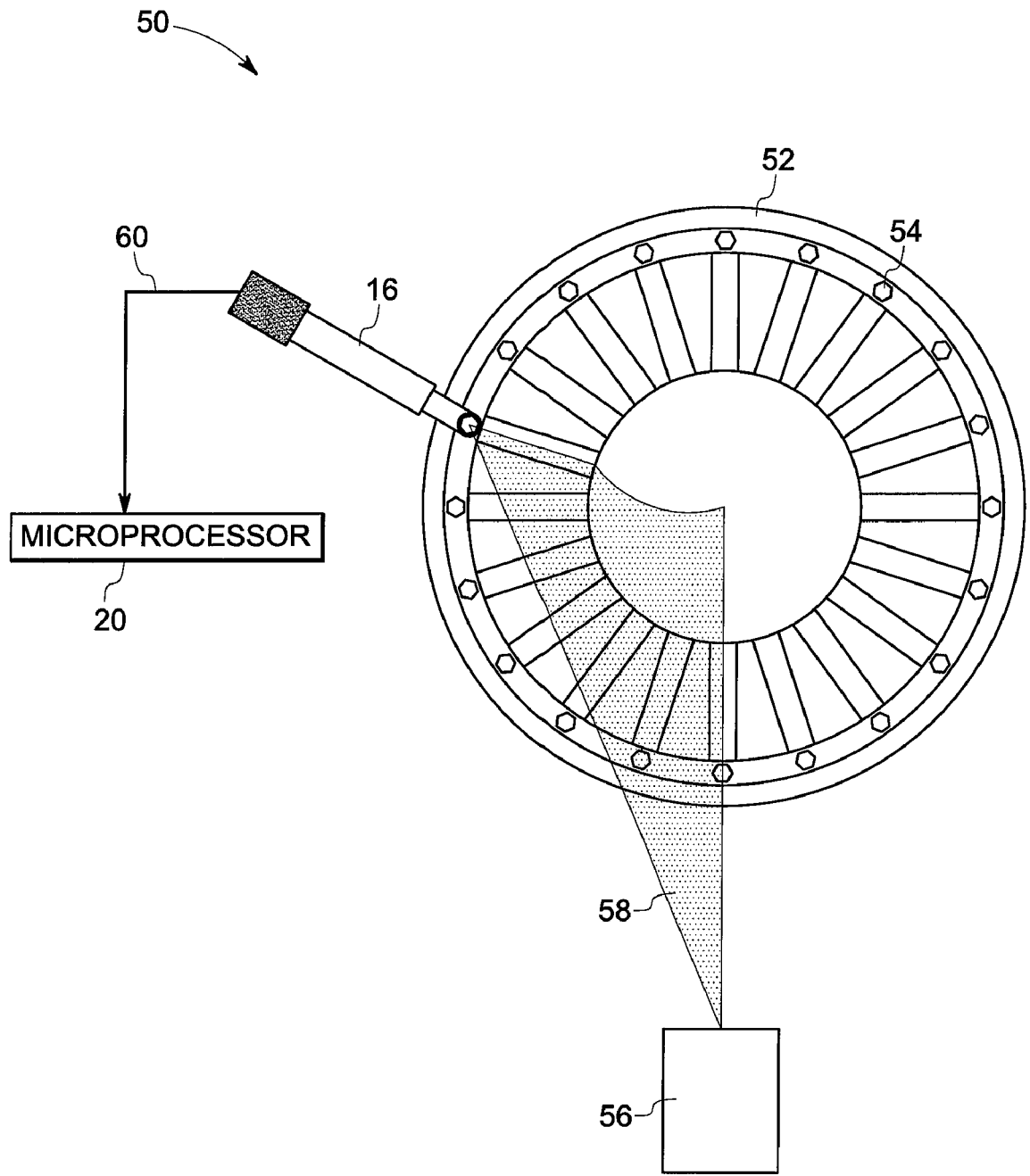
FIG. 3 is a top view of a part of an aircraft engine assembly assembled using the wireless-enabled tightening system in FIG. 1.

FIG. 3 is a top view 50 of a part of an aircraft engine assembly 52 being assembled using the wireless-enabled tightening system 10 in FIG. 1. The engine assembly 52 includes a set of bolts 54 located on a circumference of the part of the engine assembly 52. The designator 14, in this case a laser 56, emits a beam of radiation 58 that can be directed to point at each bolt around the circumference of the part of the engine assembly 52. The beam of radiation 58 acts as a spotlight on the next bolt 54 that needs to be tightened. The torque wrench 16 as referenced in FIG. 1 is used to tighten each of the bolts 54. When an appropriate amount of torque has been applied, the torque wrench 16 sends a signal 60 via a wireless transmitter 44 as referenced in FIG. 2 to a microprocessor 20 as referenced in FIG. 1. The signal may trigger a camera (not shown) to capture an image of the engine assembly 52. The captured image is processed by the microprocessor 16 to identify which bolt was tightened, determine the next bolt to be tightened, and to trigger a signal to the laser 56 to point the beam 58 to the next bolt to be tightened.

Figure 4:
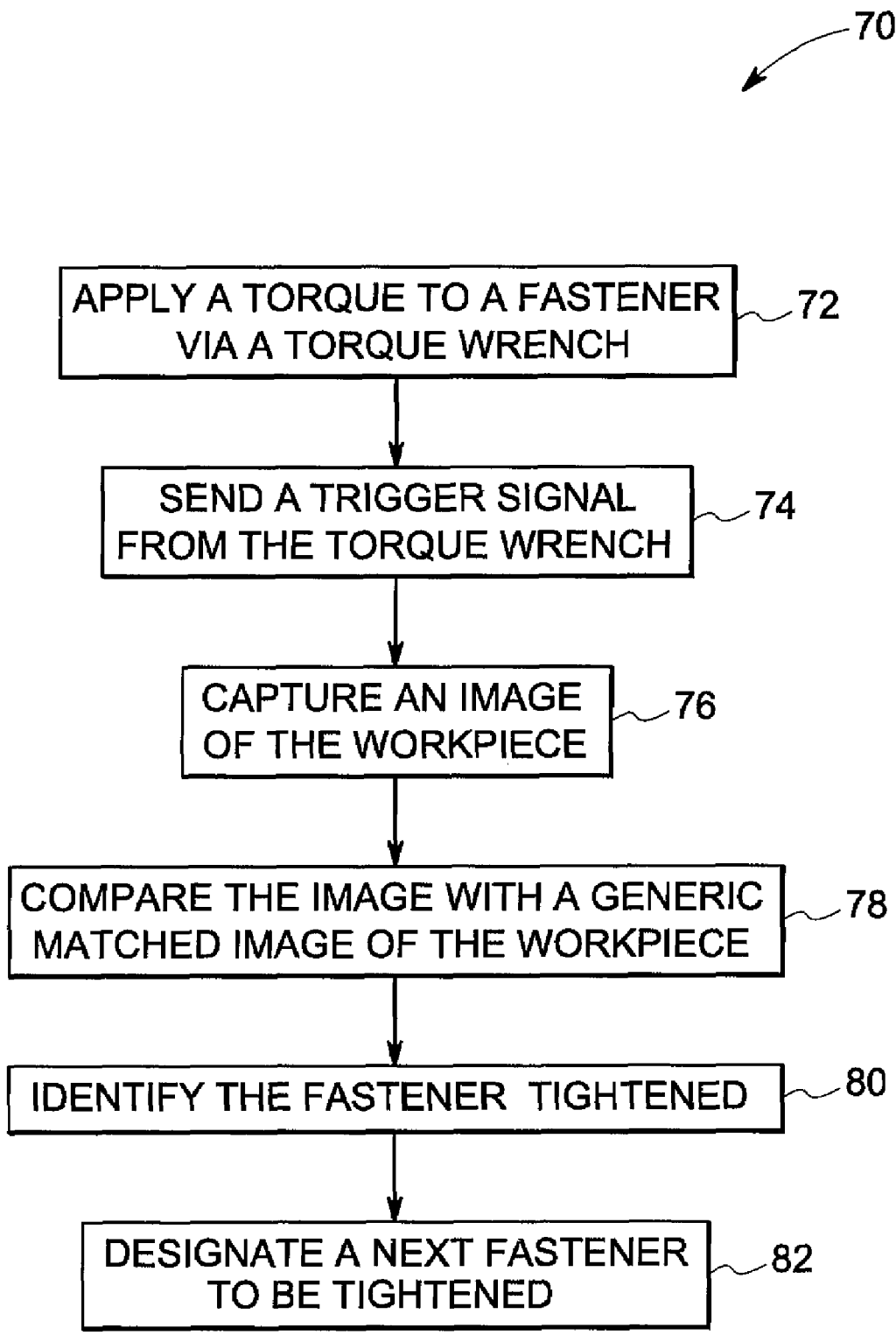
FIG. 4 is a flow chart illustrating exemplary steps involved in a method of operation of a wireless-enabled tightening system.

FIG. 4 is a flow chart illustrating exemplary steps involved in a method 70 of operation of a wireless-enabled tightening system to tighten a series of fasteners in a sequential pattern. The method 70 includes applying a torque to a fastener on a workpiece via a torque wrench until a set torque is reached in step 72. Once the set torque is reached, a trigger signal is sent from the torque wrench to a microprocessor in step 74. In a particular embodiment, the trigger signal is sent via a wireless transmitter in the torque wrench. In a particular embodiment, the trigger signal may be embedded in a data signal and transmitted as a radio frequency signal. In another embodiment, the trigger signal may be embedded in a data signal and sent as a low power radio signal. In yet another embodiment, the trigger signal may be embedded in a data signal and sent as a WiFi signal. When the trigger signal is received, an image of the workpiece is captured in step 76. In a particular embodiment, the image is captured via a camera. The captured image is compared with a generic image of the workpiece in step 78. The fastener that has been tightened is identified depending on the position of the torque wrench on the captured image in step 80. A next fastener to be tightened is designated via a visual designator in step 82. In a particular embodiment, designating a next fastener may include moving a light spot of a laser from one fastener to another. The method 70 also includes recording data such as maintaining a history and configuration of the workpiece using a microprocessor. In an example, the microprocessor 20 may store data regarding number of times a particular fastener has already been tightened. In another example, the microprocessor 20 may store data regarding the appropriate amount of torque that has to be applied to each of the fasteners.

The various embodiments of a wireless-enabled tightening system for tightening fasteners described above thus provide a way to achieve an automated and efficient system for tightening fasteners in a sequential pattern. These techniques and systems also allow for minimal error and eliminate any possible human errors.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a laser as a visual designator described with respect to one embodiment can be adapted for use with a trigger signal sent by a torque wrench in the form of a text message described with respect to another. Similarly, the various features described, as well as other known equivalents for each feature, can be mixed and matched by one of ordinary skill in this art to construct additional systems and techniques in accordance with principles of this disclosure.

Although the systems herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a torque system comprising:
applying a torque to a fastener among a series of fasteners on a workpiece via a torque wrench until a set torque is reached;
generating a trigger signal via the torque wrench once the set torque is reached;
sending the trigger signal from the torque wrench to a microprocessor;
capturing an image of the workpiece via a camera when the signal is received;

comparing the image of the workpiece with a generic image of the workpiece to identify a position of the torque wrench on the workpiece;

identifying the fastener on the workpiece that has been tightened based on the position of the torque wrench in the captured image; and designating a next fastener among the series of fasteners to be tightened via a visual designator.

2. The method of claim 1, wherein sending the trigger signal comprises sending via a wireless transmitter in the torque wrench.

3. The method of claim 1, wherein designating the next fastener comprises projecting a light spot from the visual designator onto the next fastener.

4. The method of claim 1, wherein designating the next fastener comprises using the visual designator to indicate the number of times the next fastener has been tightened in the sequence.

5. The method of claim 1, further comprising recording data using the microprocessor.

6. The method of claim 1, wherein recording data comprises maintaining history and configuration of the workpiece.

\* \* \* \* \*